United States Patent [19]

Maddalena

[11] Patent Number: 5,555,594
[45] Date of Patent: Sep. 17, 1996

[54] WATER AND DEBRIS DEFLECTOR AND VACUUM

[76] Inventor: Jack Maddalena, P.O. Box 33128, Portland, Oreg. 97233

[21] Appl. No.: 311,502

[22] Filed: Sep. 23, 1994

[51] Int. Cl.⁶ .................................................. B60J 9/00
[52] U.S. Cl. .................. 15/313; 15/312.1; 180/903; 296/180.1
[58] Field of Search ................. 15/313, 312.1; 180/903, 89.2; 296/180.1

[56] References Cited

U.S. PATENT DOCUMENTS

| | | | |
|---|---|---|---|
| 3,544,370 | 11/1967 | Wrede | 134/7 |
| 4,134,612 | 1/1979 | Nelson | 15/313 X |
| 4,324,307 | 4/1982 | Schittino et al. | 180/89.2 X |
| 4,673,206 | 1/1987 | Kretschmer et al. | 296/180.1 X |
| 5,301,996 | 4/1994 | Theis | 180/903 X |

FOREIGN PATENT DOCUMENTS 1749082  7/1992  U.S.S.R. .................................. 15/313

Primary Examiner—Chris K. Moore
Attorney, Agent, or Firm—Floyd E. Ivey

[57] ABSTRACT

The present invention relates to an apparatus and method for reducing or eliminating water, dirt and other debris from being thrown onto following vehicles during highway or road travel by introducing intercepted or compressed air across and onto the roadway surface in the forward path of vehicle tires to move water, dirt and other debris toward the roadway under the vehicle centerline and away from the tires and by capturing the moved water, dirt and other debris with a vacuum or suction thereby eliminating the source of foreign material which might be cast by tires onto following vehicles.

6 Claims, 6 Drawing Sheets

WATER AND DEBRIS DEFLECTOR AND VACUUM

FIELD OF THE INVENTION

The present invention relates generally to a method and apparatus for preventing or reducing water, dirt and other debris from being thrown onto following vehicles during highway or road travel and in particular to a method and apparatus for preventing or reducing water, dirt and other debris from being thrown from the wheels of large vehicles, including in particular tractor-trailer trucks and buses, onto following vehicles during highway or road travel by introducing directed, intercepted, compressed or forced air onto the roadway surface in front of or in the direction of travel of vehicle tires to move water, dirt and other debris away from the path of tire travel toward the centerline of the vehicle and by capturing the moved water, dirt and other debris with a vacuum or suction thereby eliminating the source of foreign material which might be cast by tires onto following vehicles.

BACKGROUND OF THE INVENTION

Vehicles traveling along a highway or roadway will inevitably pass over water, dirt or other such debris such as rocks, vehicle parts and other foreign bodies that will be thrown by the vehicle tires onto following vehicles. Water spray, dirt, dust and other material thrown onto and striking following vehicles causes interference with following vehicle operation and may cause vehicle damage and hazardous conditions endangering the safety of following vehicles.

The Antihydroplaning Method for Vehicles, U.S. Pat. No. 3,544,370 to K. W. Wrede discloses a vane and tubes for introducing forced and deflected air to the roadway surface in front of the tire to prevent hydroplaning. The Super Debris Deflector shown in U.S. Pat. No. 5,058,827 to Dansereau et al. discloses a deflector that prevents debris from being thrown by aircraft tires into the engine of an aircraft. Neither Wrede nor Dansereau address the casting or throwing of water, dirt and debris onto following vehicles. The present application enables or causes the moving or removal of water, dirt or debris from the forward motion path of vehicle tires such that such material will not be available to be thrown by tires onto following vehicles. Methods and apparatus are not known to exist in a manner similar to the configuration presented herein. There is no prior art known which provides a method and/or apparatus for the purposes and/or in a configuration similar to that addressed herein. The potential for the present invention in moving or removal of water from the forward motion path of vehicle tires and thereby reducing or preventing hydroplaning is a subsidiary consideration and is not meant to distract from the purpose of eliminating or reducing the amount of water spray, dirt, debris and other materials commonly thrown onto following vehicles. Present identification of Wrede, U.S. Pat. No. 3,544,370 and Dansereau, U.S. Pat. No. 5,058,827 is disclosed in accordance with 37 CFR 1.97.

SUMMARY OF THE INVENTION

In accordance with the present invention, a first conduit, which may be a tube or pipe, is provided which directs intercepted, compressed or forced air, via the first conduit exhaust, across and onto the roadway surface in front of and onto the path of forward travel of vehicle tires. A second conduit, which may be a tube or pipe, provides a vacuum or suction to accept or capture material moved from the roadway surface by the intercepted or compressed air. The second conduit inlet opposes, across the path of forward motion of the vehicle tire, the first conduit exhaust and is thus positioned to receive the water, dirt and other debris moved or removed by the intercepted or compressed air from the first conduit exhaust. It is expected that both the first and second conduit will be mounted, in the instance of large tractor-trailer trucks, on the tractor body or chassis and/or trailer body or frame. The first conduit may be geometrically configured so that the first conduit inlet intercepts the airstream generated by the velocity of the vehicle and so that the first conduit exhaust redirect the intercepted airstream across and onto the path of forward travel of the vehicle tires thereby moving or removing the source of foreign material, which might be cast by tires onto following vehicles, toward the centerline of the vehicle and toward the second conduit inlet. The second conduit will be geometrically configured so that the second conduit inlet opposes, across the path of forward motion of the vehicle tire, the first conduit exhaust and is thus positioned to receive, accept or capture, with a vacuum or suction, the water, dirt and other debris moved or removed by the intercepted or forced air from the first conduit exhaust. The second conduit exhaust is accepted into a filter and/or container to deposit the received, accepted and/or captured water, dirt and other debris. The vacuum or suction source for the second conduit may be supplied by means including but not limited to compressors, fans, pumps or other means. Control of compressed air and vacuum sources may be provided by manually operated switches, sensors detecting roadway conditions providing input to microprocessors and other means.

The geometry of the first and second conduits may be such as to have differing cross sections, in shape and dimension, at different points along their lengths. Means to mount and secure the debris deflector to a body, chassis, frame or other location on a vehicle will be dictated by design convenience and is not limited to particular bracket styles or mounting methods. The first and second conduit may be manufactured from any convenient material with the choice dictated by the design convenience of the user. A simple configuration of the water and debris deflector and vacuum first or second conduits could consist of assembled commercially available pvc elbows, joints and pipe. The water and debris deflector and vacuum first and second conduits may be formed of any material including but not limited to pvc, plastic, fiberglass, and metal and may have different geometrically shaped and sized cross sections along the length of the curvilinear line through the center of these variously shaped conduits. An alternative air source for the water and debris deflector and vacuum first conduit may be compressed or forced air supplied by any source of compressed air including fans, compressors, pumps and other means. The use of compressed air for the first conduit will permit construction of the first conduit from pressure rated tubing with inside diameters of, but not limited to, one-quarter inch. Such tubing may be constructed from any material capable of sustaining compressed air pressures including but not limited to pressure rated plastic tubing. The first conduit exhaust may be configured in a variety of nozzles, including a nozzle which acts to increase the first conduit exhaust air stream velocity and permit greater focus of the air stream on the area of path of forward travel immediately in front of the tire.

The preferred embodiment of the water and debris deflector and vacuum is with a first and second conduit substantially circular in cross section and tubular in shape. A first conduit curvilinear line passes through the center of the first conduit parallel to the first conduit inside and outside peripheral surfaces perpendicular to the first conduit cross section. When the first conduit is mounted on the vehicle the first conduit curvilinear line at the first conduit inlet will be approximately parallel with the direction of vehicle travel and the curvilinear line at exhaust will be approximately perpendicular to the direction of vehicle travel such as to direct exhausted air across and onto the road surface in front of the tire approximately perpendicular to the direction of travel and at an angle to the road surface so that the exhausted air directs debris toward the roadway under the vehicle centerline and toward the second conduit inlet. The second conduit is connected via a second conduit exhaust to a vacuum source and filter container. A second conduit curvilinear line passes through the center of the second conduit parallel to the second conduit inside and outside peripheral surfaces and perpendicular to the second conduit cross section. When the second conduit is mounted on the vehicle the second conduit curvilinear line at the second conduit inlet will be approximately perpendicular to the direction of vehicle travel and at an angle to the road surface such as to oppose the first conduit exhaust and receive, accept or capture moved or removed water, dirt and debris as accomplished by the first conduit exhaust. The orientation of the first and second conduit, as mounted and routed on the vehicle, between the first conduit inlet and the first conduit exhaust and the second conduit inlet and second conduit exhaust will be dictated by the mounting method and location on the vehicle and will be a design consideration for each vehicle on which the water and debris deflector and vacuum may be utilized. The vacuum source may be activated by the vehicle operator by means of a switch or through use of a microprocessor receiving a signal from a sensor detecting road conditions of water, dirt and debris requiring operation of the invention. As an alternative embodiment the second conduit and vacuum may be dispensed with leaving only the first conduit exhaust to move or remove water, dirt and other debris from the path of forward motion in front of the tires and toward the vehicle centerline. An additional alternative embodiment utilizes compressed or forced air at the first conduit inlet and may employ a nozzle at the first conduit exhaust. The compressed or forced air source may be activated by the vehicle operator by means of a switch or through use of a microprocessor receiving a signal from a sensor detecting road conditions of water, dirt and debris requiring operation of the invention.

The first conduit exhaust and the second conduit inlet are separated by a distance approximating the width of the tire at which they are located and are positioned in opposition to each other. Where dual or multiple wheels and tires are encountered the first conduit exhaust may be focused on the width of the combined tires and will be separated from the second conduit inlet by the approximate width of the combined tires. An alternative arrangement where dual or multiple wheels and tires are encountered will be the placement of a first conduit exhaust and second conduit inlet at each tire or more than one first conduit exhaust and second conduit inlet at each set of dual or multiple wheels and tires on each axle.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
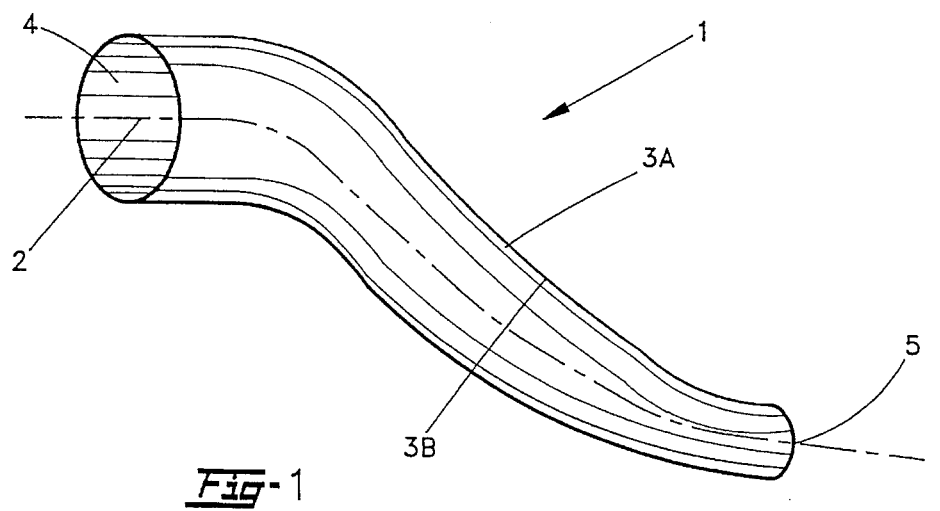
FIG. 1 is a first conduit inlet perspective view of the water and debris deflector and vacuum first conduit.
Figure 2C:
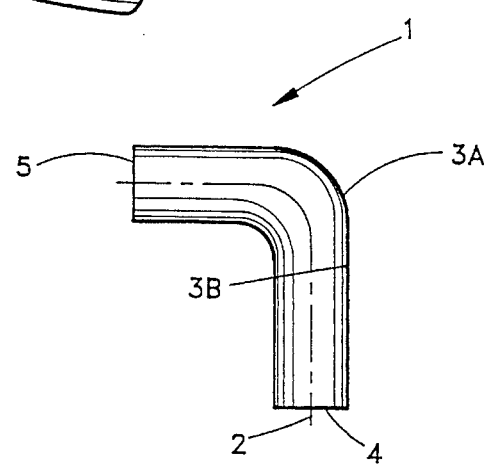
FIG. 2C is a top plan view of the first conduit.
Figure 2B:
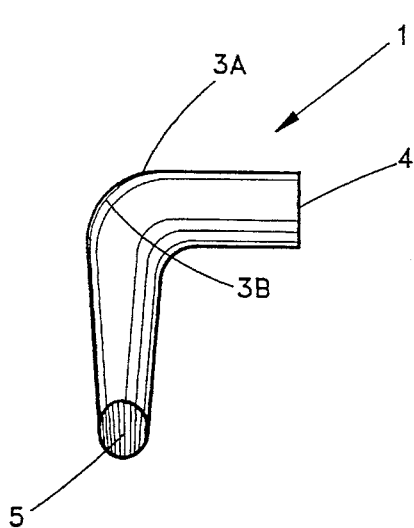
FIG. 2B is a side elevational view illustrating the first conduit from the side which would be adjacent to the vehicle when installed.
Figure 2A:
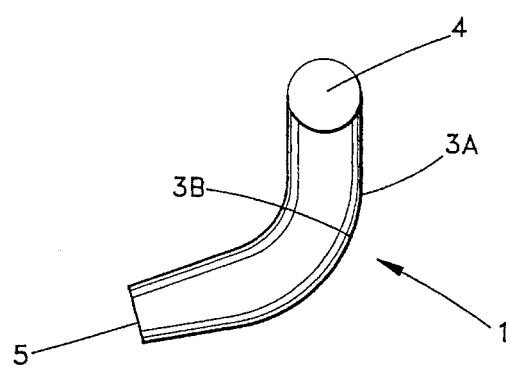
FIG. 2A is a front elevational view of the first conduit.
Figure 3:
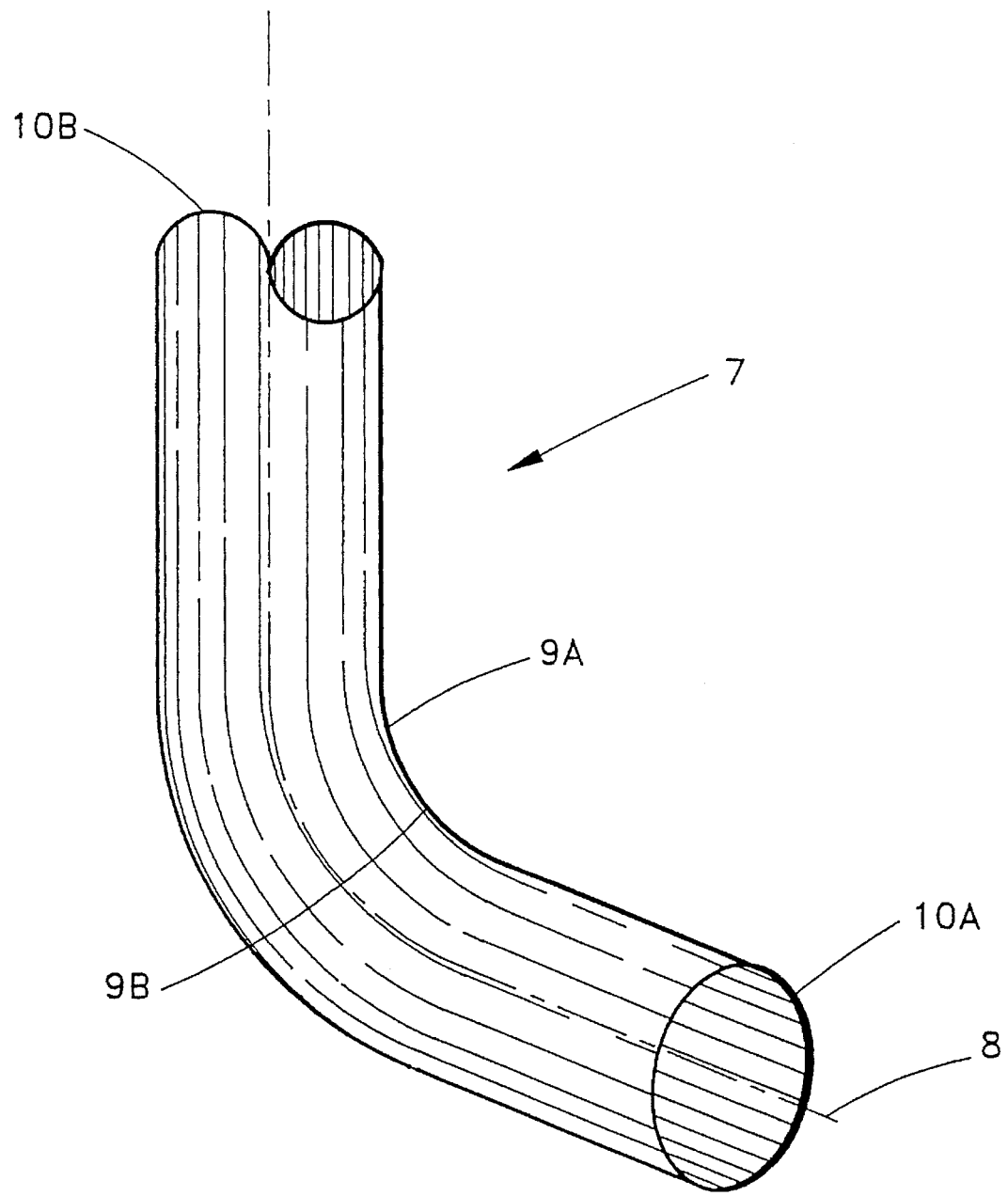
FIG. 3 is a second conduit inlet perspective view of the second conduit.
Figure 4:
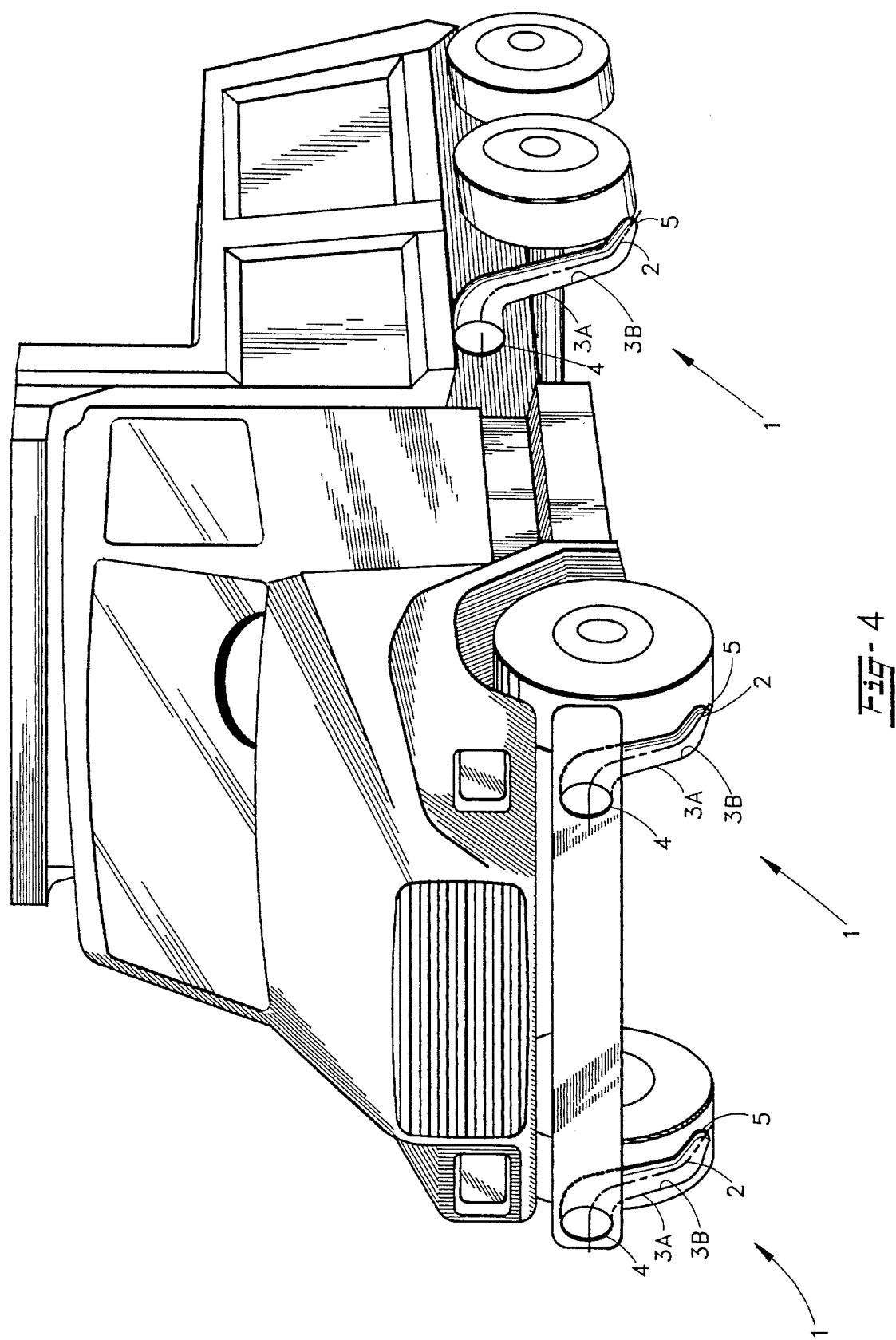
FIG. 4 is a perspective view of the water and debris deflector and vacuum first conduit mounted on a truck tractor.
Figure 6:
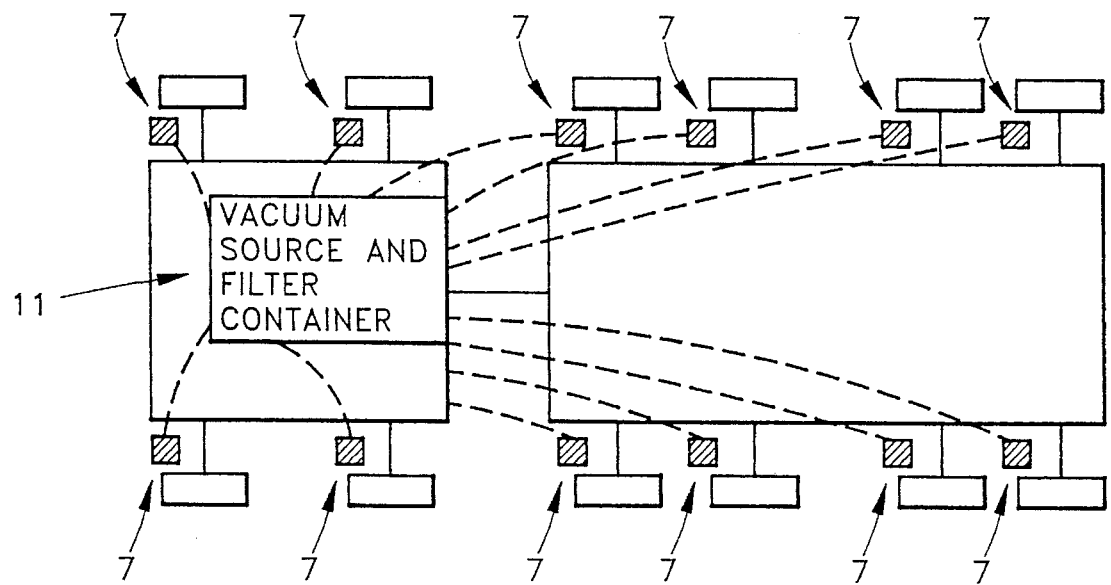
FIG. 6 is schematic representation of a truck tractor and trailer with a vacuum source and filter container and second conduits routed to each vehicle wheel.

FIG. 1 and 2A, 2B and 2C illustrate perspective, elevation and plan views of the first conduit inlet and first conduit, FIG. 3 illustrates the perspective view of the second conduit inlet, FIG. 4 illustrates the mounted water and debris deflector and vacuum first conduit and FIG. 6 is a schematic representation of the mounted water and debris deflector and vacuum second conduit. FIGS. 1, 2A, 2B, 2C, 3, 4, and 6 substantially tubular in shape has a cross section and a first conduit curvilinear line (2) passes through the center of the tubular first conduit (1) parallel to the first conduit inside and outside peripheral surfaces (3A, 3B) and perpendicular to the first conduit cross section. A first conduit inlet (4) intercepts air created by the velocity of the vehicle to be directed by the first conduit exhaust (5) across and onto the forward motion path of the vehicle's tires, moving water, dirt and debris toward the vehicle centerline and toward the second conduit inlet (10A). A second conduit (7) substantially tubular in shape has a cross section and a second conduit curvilinear line (8) passes through the center of the tubular second conduit (7) parallel to the second conduit inside and outside peripheral surfaces (9A, 9B) and perpendicular to the second conduit cross section. A second conduit inlet (10A) offers a vacuum means via a vacuum source and filter container (11) and is positioned to oppose, across the path of forward travel of the vehicle tire, the first conduit exhaust (5) and receives, accepts and captures moved or removed water, dirt and debris as accomplished by the first conduit exhaust (5) to be deposited through the second conduit exhaust (10B) into the vacuum source and filter container (11).

Figure 5:
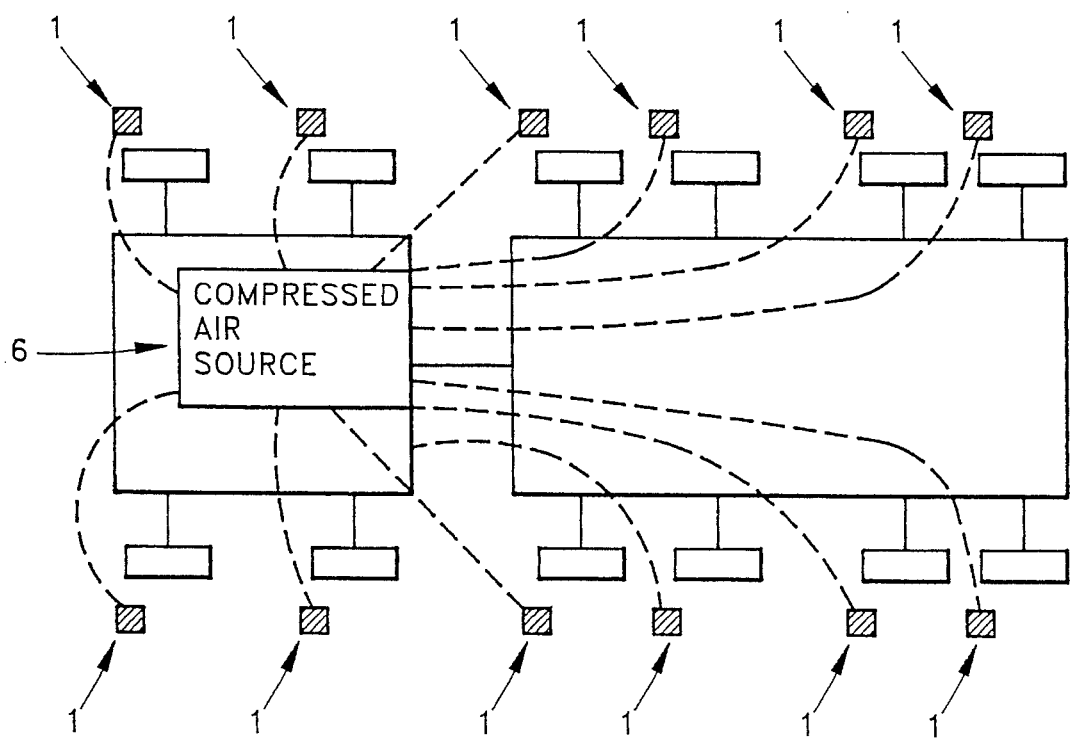
FIG. 5 is a schematic representation of a truck tractor and trailer with a compressed air source and first conduits routed to each vehicle wheel.

FIG. 5 is a schematic representation of the water and debris deflector and vacuum first conduit (1) mounted on a truck tractor and trailer with a compressed air source (6) introducing compressed or forced air at the first conduit inlet (4) to be exhausted, by the first conduit exhaust (5), across and onto the forward motion path of the vehicle tires.

FIG. 6 is a schematic representation of the water and debris deflector and vacuum second conduit (7) mounted on a truck tractor and trailer with a vacuum source and filter container (11) providing vacuum to a second conduit inlet (10A) to receive, accept and capture moved and removed water, dirt and other debris to be deposited through the second conduit exhaust (10B) in the vacuum source and filter container (11).

Figure 7:
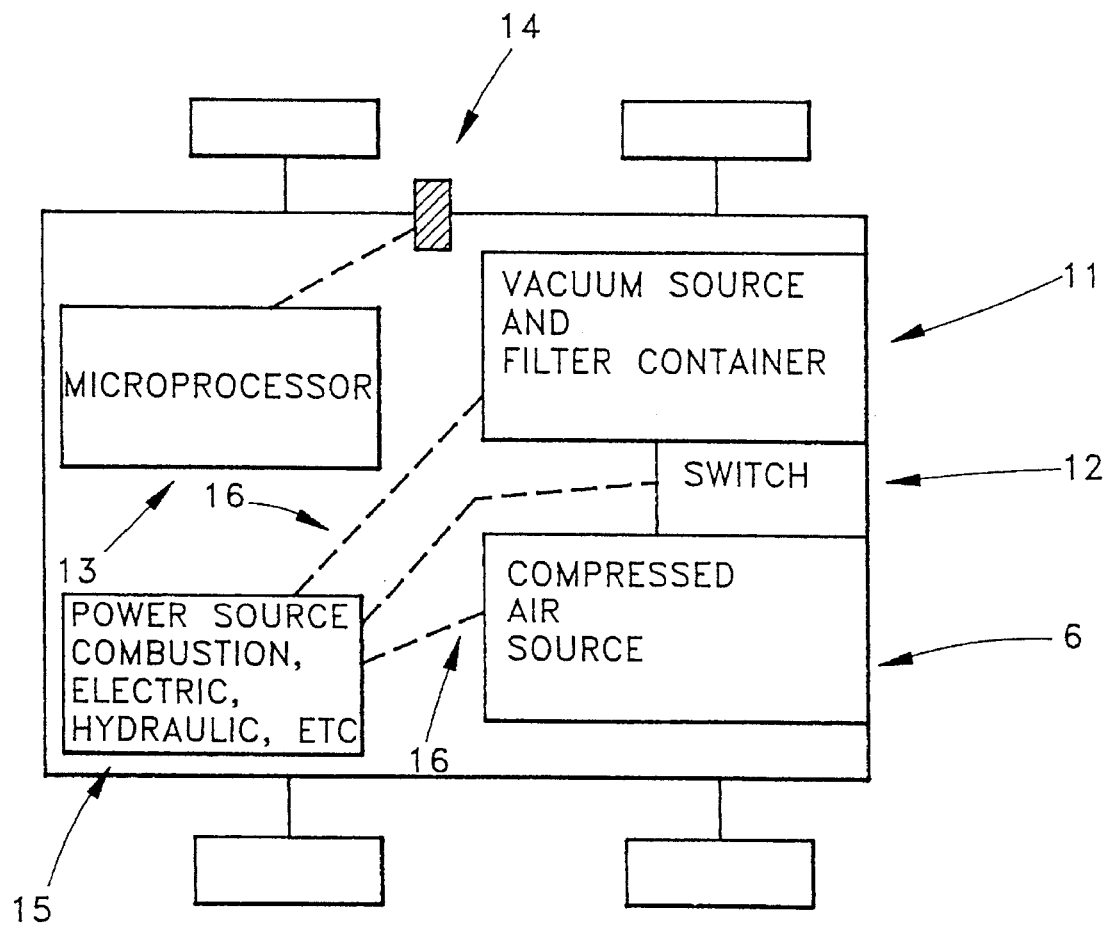
FIG. 7 is schematic representation of a microprocessor, sensor and switch control for the water and debris deflector and vacuum.

FIG. 7 is a schematic representation of the controls for the compressed air source (6) and vacuum source and filter container (11). A variety of power sources (15) may be used to activate the compressed air source (6) and or vacuum source and filter container (11) including combustion, electric, hydraulic or other sources with engagement means (16) transmitted to the compressed air source (6) and or vacuum source and filter container (11) via belts, gears, joints, motors or other means. Control signals may originate from a microprocessor (13) with input from a sensor (14) detecting road conditions of water, dirt and debris or from a switch (12) commanded by the vehicle operator or by other means.

Figure 8:
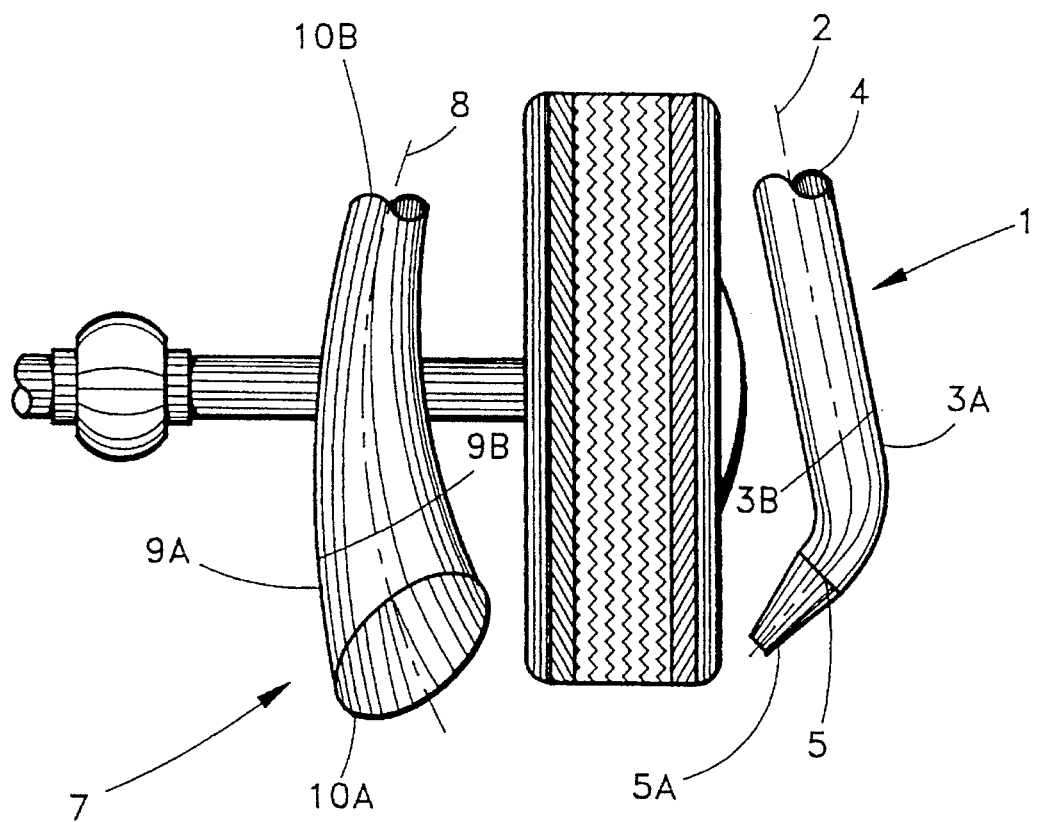
FIG. 8 is a front view of a tire illustrating the positioning of the first conduit exhaust with nozzle and the second conduit inlet.

FIG. 8 illustrates the front view of a vehicle tire and the positioning of the first conduit (1) with nozzle (5A) and the second conduit (7) and second conduit inlet (10A).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A water and debris deflector and vacuum adapted to automotive and other vehicle use comprising:
   A. a first conduit having first conduit inside and outside peripheral surfaces, a first conduit curvilinear line parallel to the first conduit inside and outside peripheral surfaces, a first conduit inlet and a first conduit exhaust;
   B. a second conduit having second conduit inside and outside peripheral surfaces, a second conduit curvilinear line parallel to the second conduit inside and outside peripheral surfaces, a second conduit inlet and a second conduit exhaust;
   B. means for mounting said first conduit to a vehicle so that said first conduit curvilinear line at the first conduit inlet is substantially parallel with the direction of vehicle travel and at the first conduit exhaust is substantially perpendicular to the direction of travel and at an angle to the road surface such that the exhausted air forces water and debris toward the roadway under the vehicle centerline and toward the second conduit inlet;
   C. means for mounting said second conduit to a vehicle so that said second conduit curvilinear line at the second conduit inlet is approximately perpendicular to the direction of vehicle travel and at an angle to the road surface such as to oppose the first conduit exhaust and receive, accept or capture moved or removed water, dirt and debris as accomplished by the first conduit exhaust;
   D. means for providing a vacuum or suction source for the second conduit inlet and means to receive and contain, from the second conduit exhaust, water, dirt and other debris received, accepted and captured by the second conduit inlet from the first conduit exhaust, and control means for activating the vacuum or suction source.

2. A water and debris deflector and vacuum according to claim 1 wherein said first and second conduits are substantially circular in cross section and tubular in shape.

3. A water and debris deflector and vacuum according to claim 1 with means to introduce compressed air at the first conduit inlet and with a nozzle at the first conduit exhaust.

4. A water and debris deflector and vacuum adapted to automotive and other vehicle use comprising:
   A. a first conduit having first conduit inside and outside peripheral surfaces, a first conduit curvilinear line parallel to the first conduit inside and outside peripheral surfaces, a first conduit inlet and a first conduit exhaust; a second conduit having second conduit inside and outside peripheral surfaces, a second conduit curvilinear line parallel to the second conduit inside and outside peripheral surfaces, a second conduit inlet and a second conduit exhaust
   B. means to introduce compressed air at the first conduit inlet;
   C. means for mounting said first and second conduit to a vehicle so that said first conduit curvilinear line at the first conduit exhaust is substantially perpendicular to the direction of travel and at an angle to the road surface such that the exhausted air forces water and debris toward the roadway under the vehicle centerline and toward the second conduit inlet;
   D. means for mounting said second conduit to a vehicle so that said second conduit curvilinear line at the second conduit inlet is approximately perpendicular to the direction of vehicle travel and at an angle to the road surface such as to oppose the first conduit exhaust and receive, accept or capture moved or removed water, dirt and debris as accomplished by the first conduit exhaust;
   E. means for providing a vacuum source for the second conduit inlet and means to receive and contain, from the second conduit exhaust, water, dirt and other debris received, accepted and captured by the second conduit inlet from the first conduit exhaust;
   F. control means for activating the vacuum source and the compressed air source.

5. A water and debris deflector and vacuum according to claim 4 wherein said first and second conduit are substantially circular in cross section and tubular in shape.

6. A water and debris deflector and vacuum according to claim 4 with a nozzle at the first conduit exhaust.

* * * * *